United States Patent [19]

Lin

[11] Patent Number: 5,037,127

[45] Date of Patent: Aug. 6, 1991

[54] VEHICLE WHEEL SUSPENSION KNUCKLE ASSEMBLY

[76] Inventor: Jin-Yeng Lin, No. 18, Ta Yu Street, Lu Kang Town, Changhua Hsien, Taiwan

[21] Appl. No.: 438,265

[22] Filed: Nov. 20, 1989

[51] Int. Cl.$^5$ ............................................... B60G 3/18
[52] U.S. Cl. .................................... 280/690; 280/688; 280/660
[58] Field of Search ............... 280/689, 690, 701, 673, 280/674, 675, 697, 660

[56] References Cited

U.S. PATENT DOCUMENTS

| | | | |
|---|---|---|---|
| 4,603,882 | 2/1986 | Kijima et al. | 280/690 |
| 4,695,073 | 9/1987 | Pettibone et al. | 280/690 |
| 4,744,586 | 5/1988 | Shibahata | 280/689 |

Primary Examiner—Richard A. Bertsch
Attorney, Agent, or Firm—Bacon & Thomas

[57] ABSTRACT

A vehicle wheel suspension knuckle assembly to match with car spring system in suspending a car wheel, which includes a treble knuckle comprising an upper pivot hole for connection with a car wheel at a point opposite to the car suspension system, an intermediate pivot hole for connection to a car frame through a forked suspension knuckle arm, and a bottom pivot hole for connection to the same car frame through a lower suspension knuckle arm. While running through uneven ground surface, the car wheel will be respectively driven by the suspension knuckle assembly and its original suspension system to constantly maintain the wheel in a vertical position.

3 Claims, 3 Drawing Sheets

VEHICLE WHEEL SUSPENSION KNUCKLE ASSEMBLY

BACKGROUND OF THE INVENTION

1. Field of the Invention

This invention relates to a vehicle wheel suspension knuckle assembly connected to a vehicle wheel at a lower position opposite to the car spring system to efficiently suspend and maintain a vehicle wheel in a constantly vertical position during running.

2. Description of the Prior Art

Vehicle wheel suspension system serve to suspend a vehicle wheel from a vehicle frame and to constantly maintain a vehicle wheel in a vertical position so as to protect from wear and tear and to extend the service life of a vehicle wheel. Regular vehicle suspension system normally includes a spring vertically mounted on a positioning rod of a vehicle wheel. While running over an uneven ground surface, a vehicle wheel may slightly incline inward or outward and the vehicle spring system will be unable to work properly. In consequence, the vehicle tire will easily sustain wear and tear.

SUMMARY OF THE INVENTION

It is therefore, the main object of the present invention is to provide such a vehicle wheel suspension knuckle assembly which helps to constantly maintain a car wheel in a vertical position during running so as to stabilize the steering of the car.

Another object of the present invention is to provide such a vehicle wheel suspension knuckle assembly which permits a car spring system to constantly sustain vertical forces so as to achieve maximum performance.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
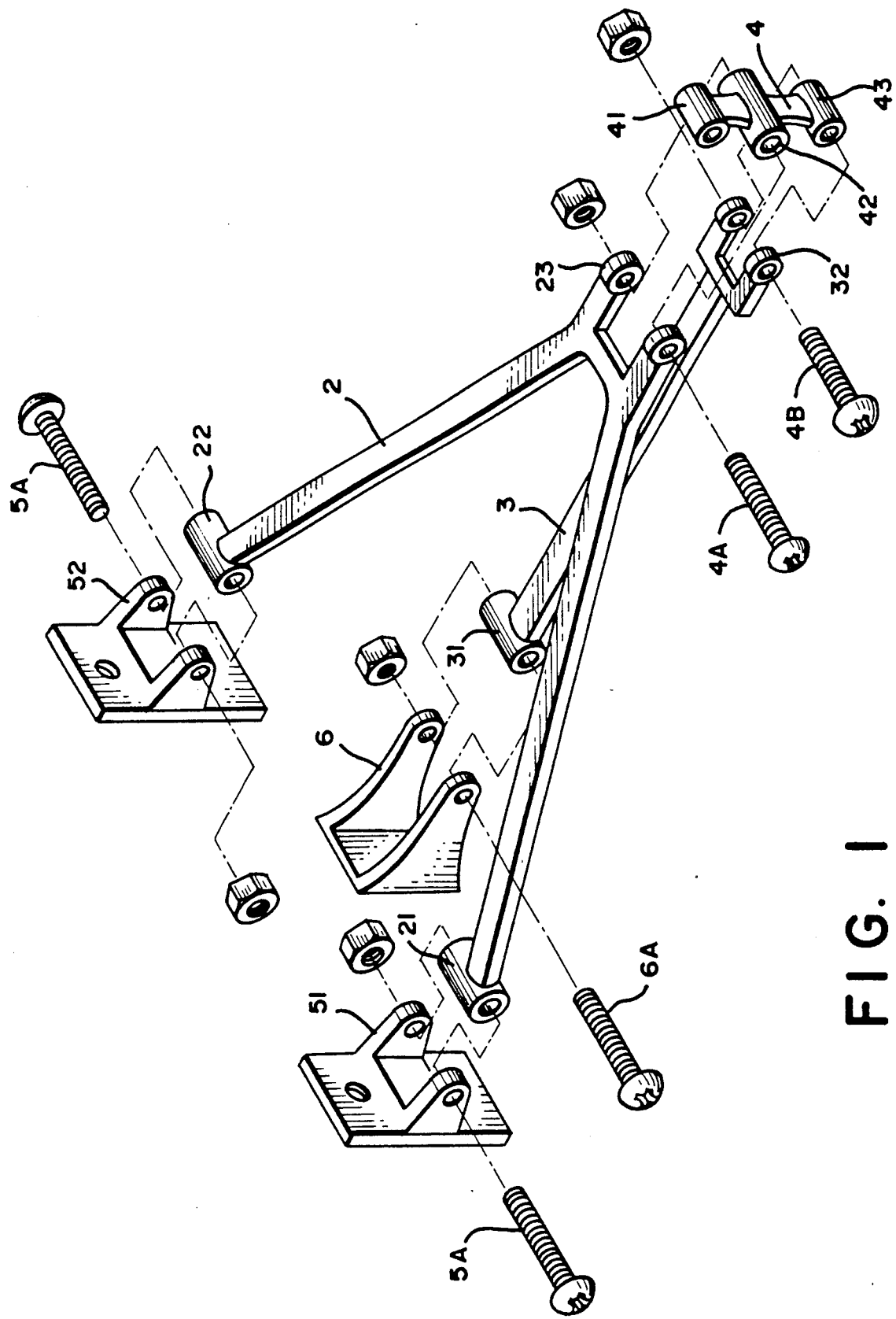
FIG. 1 is a perspective exploded view of the present invention.
Figure 2:
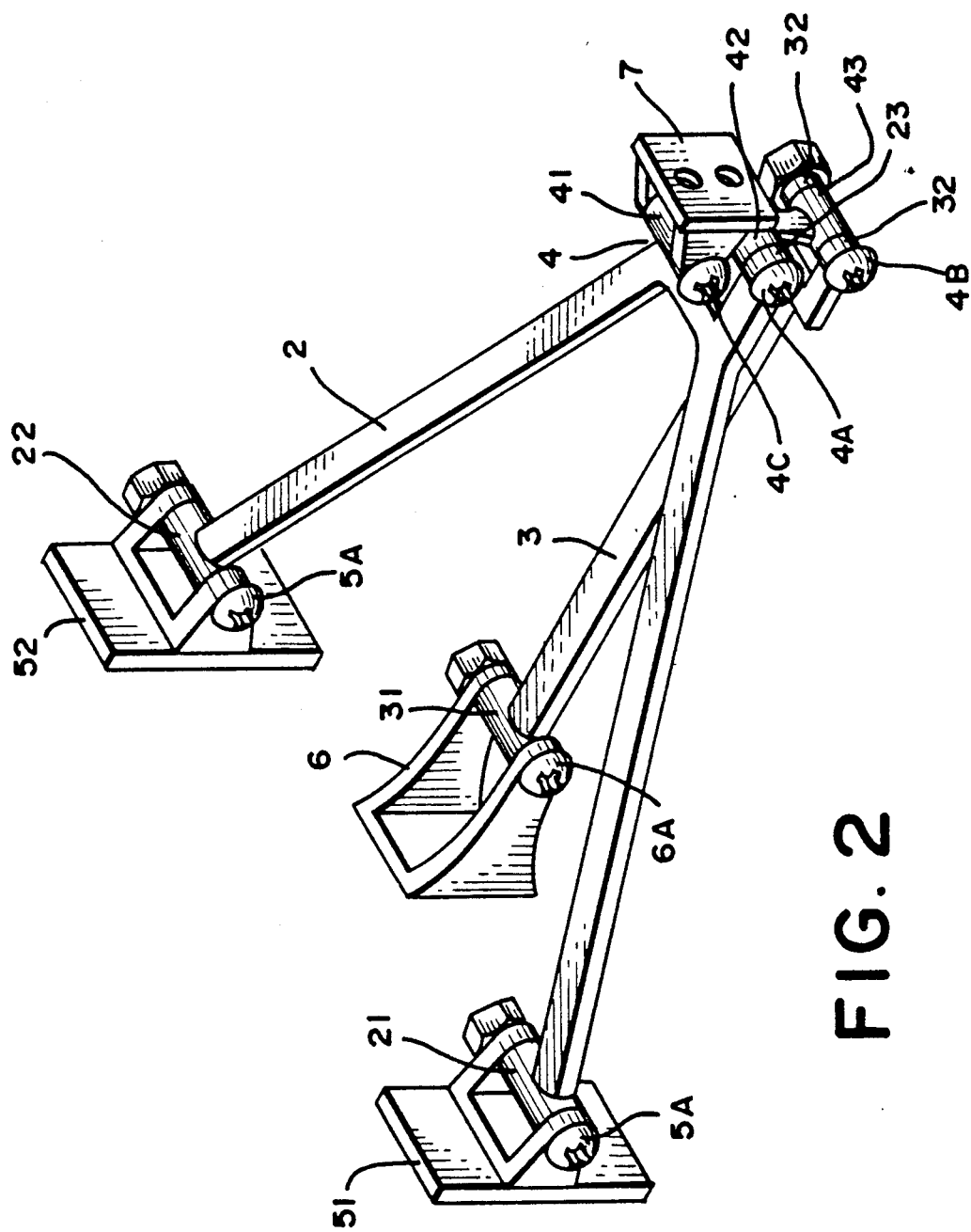
FIG. 2 is a perspective assembly view of the present invention.

Referring to FIGS. 1 and 2, a vehicle wheel suspension knuckle assembly of the present invention is generally comprised of a forked suspension knuckle arm 2, a lower suspension knuckle arm 3 and a treble suspension knuckle 4. The forked suspension knuckle arm 2 is relatively longer and having a pair of sockets 21 and 22 at the forked end for insertion therethrough of a pair of screw bolts 5A to secure to a pair of socket holders 51 and 52 fixedly mounted on a vehicle frame. A socket holder 23 is integrally formed on the forked suspension knuckle arm 2 at the front end. The lower suspension knuckle arm 3 is relatively shorter, having a socket 31 made at the rear end and a socket holder 32 at the front end. Another elongated socket holder 6 is mounted on the vehicle frame at a position right below the two socket holders 51 and 52 for insertion therethrough to secure the socket 31 of the lower suspension knuckle arm 3. When the forked suspension knuckle arm 2 and the lower suspension knuckle arm 3 are respectively mounted on the socket holders 51, 52 and 6, the front socket holder 32 of the lower suspension knuckle arm 3 is disposed right below the front socket holder 23 of the forked suspension knuckle arm 2. The treble suspension knuckle 4 is unitarily comprised of three sockets 41, 42 and 43, i.e. an upper socket 41, an intermediate socket 42 for connection with the front socket holder 23 by a screw bolt 4A, and a bottom socket 43 for connection with the front socket holder 32 by a screw bolt 4B.

Figure 3A:
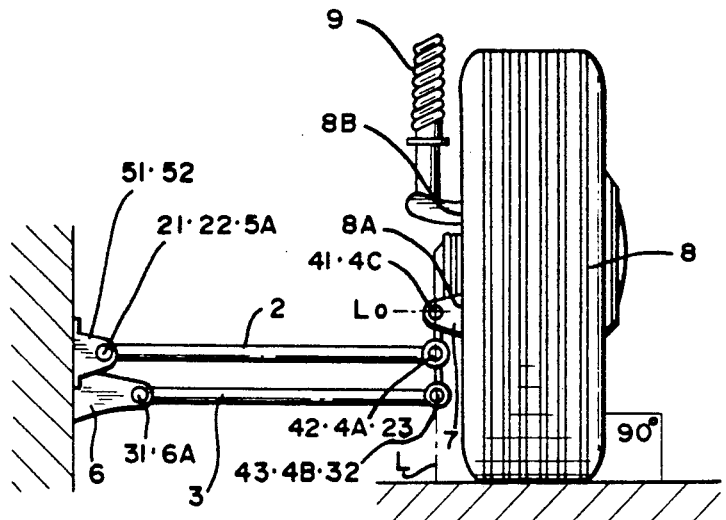
FIG. 3A illustrates the mounting of the present invention on a vehicle wheel positioned at a horizontal level in zero angle of inclination.
Figure 3B:
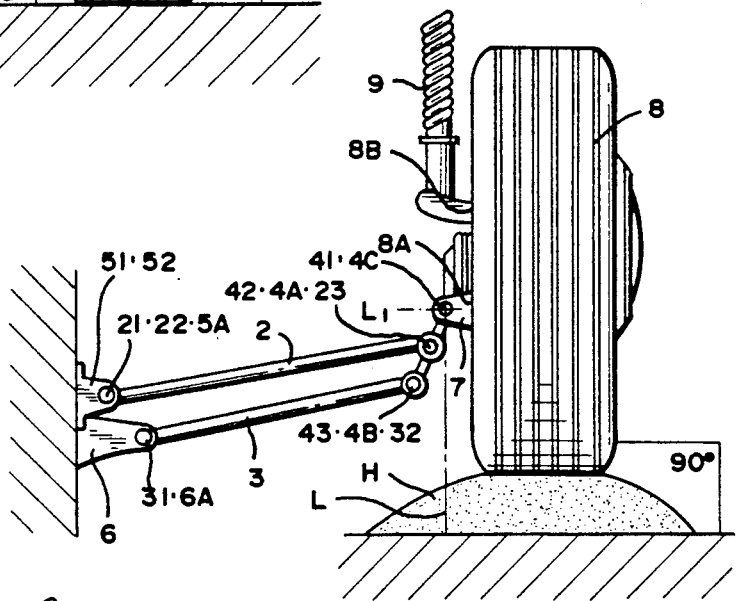
FIG. 3B illustrates the operation of the present invention in connection with a vehicle wheel, wherein the vehicle wheel is in a lifted condition (no angle of inclination)
Figure 3C:
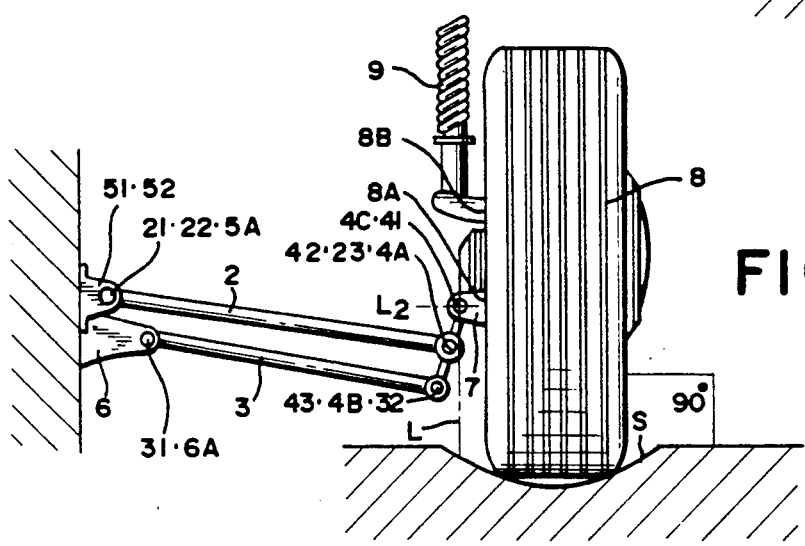
FIG. 3C illustrates the operation of the present invention in connection with a vehicle wheel, wherein the vehicle wheel is in a submerged condition (no angle of inclination).

Referring to FIGS. 3A through 3C, a screw bolt 4C is inserted through the upper socket 41 of the suspension knuckle 4 to secure the suspension knuckle 4 to a socket holder 7 mounted on a vehicle wheel 8 at point 8A (see FIG. 3A) a car spring system 9 is connected to the wheel 8 at a point 8B opposite to the point 8A and disposed in parallel with the wheel 8, i.e. vertical to the suspension knuckle assembly. When the wheel 8 is standing still, it is disposed at an angle of 90 against the ground surface, and the sockets 41, 42, and 43 of the suspension knuckle 4 are respectively disposed along the same vertical axis L. While the wheel 8 is passing through a raised surface H (see FIG. 3B); it follows the raised surface H to lift. At the same time, upper socket 41 of the suspension knuckle 4 is dragged to lift, and the intermediate and bottom sockets of the suspension knuckle 4 are dragged by the forked suspension knuckle arm 2 and the lower suspension knuckle arm 3. Therefore, the suspension knuckle 4 becomes slightly inclined with the lower end moving inwardly from the vertical axis L, and with the upper socket 41 disposed at a higher position L1 in the vertical axis L, to match with the car spring system 9 to secure the wheel 8 in a vertical position (zero angle of inclination). When the wheel 8 follows a concave portion 5 below the ground surface (see FIG. 3C), the bearing point 8A follows the wheel 8 to sink downwardly into portion 5 and the upper socket 41 of the suspension knuckle 4 is tightly dragged. Through the effect of the intermediate and bottom sockets 42 and 43, the suspension knuckle 4 becomes slightly inclined with the lower end moving inwardly from the vertical axis L and the upper socket 41 disposed at a lower position L2 in the vertical axis L to further match with the car spring system 9 to secure the wheel 8 in a vertical position (zero angle of inclination). Therefore, through the application of the present vehicle wheel suspension knuckle assembly, a vehicle wheel can be constantly maintained in a vertical position during driving of the vehicle.

The foregoing embodiment of the present invention is suitable for mounting a vehicle rear wheel. For use in vehicle front wheels, the relative structure of the upper socket 41 of the suspension knuckle 4 and the socket holder 7 at the lower bearing point of a wheel must be modified, i.e. an a universal socket must be used to replace the upper socket 41, and the socket holder 7 must be provided to secure the universal socket.

I claim:

1. A vehicle wheel suspension knuckle assemble, comprising:
   a forked suspension knuckle arm having a pair of sockets at a rear forked end for insertion therethrough of a pair of screw bolts to secure to a pair of socket holders fixedly mounted on a vehicle frame, and a socket holder at a front end;
   a lower suspension knuckle arm being relatively shorter than said forked suspension knuckle arm and having a socket at a rear end for insertion therethrough of a screw bolt to secure to a socket holder fixedly mounted on a vehicle frame right below the pair of socket holders to which the forked end of said forked suspension knuckle arm is connected, and a socket holder at a front end;
   a treble suspension knuckle having an upper socket portion, an intermediate socket portion and a bottom socket portion, said upper socket portion being connected to a socket holder fixedly mounted on a vehicle wheel, said intermediate socket portion being connected to the socket holder of said forked suspension knuckle arm, said bottom socket holder being connected to the socket holder of said lower suspension knuckle arm; and
   the upper, intermediate and bottom socket portion connections define a linear array along a vertical axis when the vehicle wheel is on an even ground surface, with the intermediate and bottom socket portion connections moving inwardly away from the vehicle axis and the upper socket portion connection moving along the vertical axis when the wheel is on an uneven ground surface to constantly maintain the wheel in a vertical position during driving of the vehicle.

2. The vehicle suspension knuckle assembly according to claim 1, wherein the upper socket portion of said suspension knuckle is a universal socket.

3. The vehicle wheel suspension knuckle arm assembly according to claim 1 wherein the forked suspension knuckle arm is encompassed within a plane that is disposed substantially in parallel with the lower suspension knuckle arm.

* * * * *